(12) United States Patent
Hajjar et al.

(10) Patent No.: US 6,344,912 B1
(45) Date of Patent: Feb. 5, 2002

(54) HYBRID AND SCALABLE OPTO-ELECTRONIC PROCESSING IN A WAVELENGTH-DIVISION MULTIPLEXED SYSTEM

(75) Inventors: Roger A. Hajjar, San Jose; Amit Jain, Sunnyvale, both of CA (US)

(73) Assignee: Versatile Optical Networks, Sunnyvale, CA (US)

( * ) Notice: Subject to any disclaimer, the term of this patent is extended or adjusted under 35 U.S.C. 154(b) by 0 days.

(21) Appl. No.: 09/575,729

(22) Filed: Aug. 7, 2000

Related U.S. Application Data

(60) Provisional application No. 60/207,643, filed on May 26, 2000, and provisional application No. 60/209,915, filed on Jun. 6, 2000.

(51) Int. Cl.$^7$ ............................................. H04J 14/02
(52) U.S. Cl. ........................ 359/128; 359/163; 385/16
(58) Field of Search ................................. 319/128, 163, 319/117; 385/16

(56) References Cited

U.S. PATENT DOCUMENTS 5,450,224 A * 9/1995 Johansson .................... 359/128
5,953,143 A * 9/1999 Sharony et al. .............. 359/128

* cited by examiner

Primary Examiner—Kinfe-Michael Negash
(74) Attorney, Agent, or Firm—Fish & Richardson P.C.

(57) ABSTRACT

Scalable and modular WDM systems to provide a number of processing functions which include, among others, signal detection, signal monitoring, wavelength conversion, signal regeneration, and generation of new WDM channels. Such WDM systems include a platform with an optical switching network and module slots for engaging WDM modules of different processing functions. Both protocol transparent and opaque WDM modules may be included in such a WDM system to provide versatile applications.

34 Claims, 10 Drawing Sheets

HYBRID AND SCALABLE OPTO-ELECTRONIC PROCESSING IN A WAVELENGTH-DIVISION MULTIPLEXED SYSTEM

CROSS REFERENCE TO RELATED APPLICATIONS

Continuity Statement

This application claims the benefits of U.S. Provisional Application No. 60/207,643, filed May 26, 2000, and No. 60/209,915, filed Jun. 6, 2000.

BACKGROUND OF THE INVENTION

This application relates to devices and systems for optical wavelength-divisional multiplexed ("WDM") communication systems, and more specifically, to devices and systems for processing WDM signals.

An optical WDM system uses a single fiber link to simultaneously transmit optical carriers of different wavelengths so that different channels of data can be carried by the different carriers and sent over the optical fiber link at the same time. The optical signal in such a fiber link is a WDM signal because it is a combination of different optical carriers at different wavelengths. Hence, a WDM system can provide a broadband transmission and a high transmission speed. Dense WDM ("DWDM") techniques have been used to increase the number of multiplexed wavelengths in a WDM fiber link by reducing the wavelength spacing between two adjacent wavelengths. In addition, a WDM system can be made scalable to allow expansion of the transmission capacity by simply adding the number of optical carriers in the existing fiber links without adding new fiber links.

One of the technical issues of WDM systems is the handling or processing of the WDM signals in a WDM network, including, among others, routing, switching, demultiplexing, multiplexing, adding, dropping, wavelength conversion, and regenerating. Various techniques have been developed or are under development to address these and other WDM processing issues. Some of these techniques use an "opaque" design in which the optical WDM signals are first converted into electronic form for electronic processing and then are converted back into the optical domain for transmission. The electronic conversion allows many signal processing operations to be performed electronically by electronic circuits and devices, including switching, regenerating, buffering, monitoring the bit error rate, etc.

The opaque systems can use matured and well-established electronic technologies to provide relatively reliable operations and performance. However, the optical-electronic-optical conversion may increase the operational latency and require expensive optical-electronic converting devices. In particular, such conversion is usually data-format specific and must be designed to meet the requirements of existing protocols and data bit rates. Hence, although the converting devices can be designed to accommodate multiple existing data formats but it can be difficult, if not impossible, to adapt the converting devices to new data formats emerged in the future.

One alternative to the opaque design is a "transparent" design where no optical-to-electronic conversion is performed and an optical signal is directly routed or switched in the optical domain. Many conventional transparent systems passively direct each optical carrier at a specific wavelength to a fixed port or a desired port according to a command without changing the properties of the carrier such as the carrier wavelength and the data format embedded therein. Hence, such transparent systems are "transparent" to the protocols and data bit rates of different signals in different optical carriers. In addition, complex and expensive optical-electronic-optical converting devices can be eliminated to reduce the system cost, physical size, and power requirements.

SUMMARY OF INVENTION

The present disclosure includes hybrid opto-electronic WDM processing systems that combine features of both the opaque and transparent designs to provide scalable and versatile WDM processing capabilities. The scalability of such hybrid systems allows processing of WDM signals with variable numbers of multiplexed channels of different wavelengths and permits receiving and processing a variable number of WDM signals or input WDM fibers. The processing functions include, among others, signal detection, signal monitoring, wavelength conversion, signal regeneration, and generation of new WDM channels. The versatile aspect of such hybrid systems allows system reconfiguration to meet different existing application requirements and adaptability to future updates and new application requirements. A reconfigurable modular WDM architecture is disclosed to achieve desired scalability and versatility for the evolving optical WDM fiber communications.

A WDM processing system according to one embodiment may include an optical switching fabric with an array of optical switching elements and a plurality of module slots surrounding the switching fabric for engaging removable processing modules to optically communicate with the switching fabric. Each removable module includes a plurality of receiving or transmitting ports that are optically linked to the respective switching elements in the switching fabric when engaged in a respective module slot. This WDM processing system is scalable because the number of inputs of each input module or the number of outputs of each output module can be expanded up to a maximum number set by the design of the switching fabric.

In one implementation, an input demux module, an output mux module, a laser module with an array of lasers of different wavelengths, and a detector array with an array of photodetectors are engaged to selected module slots. Each of the lasers may be driven by a respective output signal from a photodetector to convert a WDM wavelength or to regenerate a signal at the same wavelength. In addition, each laser may be driven by a control signal to produce a new signal with a new channel of data at a desired WDM wavelength.

In another implementation, one or more arrays of semiconductor optical amplifiers may be placed in one or more module slots. Each semiconductor optical amplifier may be designed to use the semiconductor gain medium to optically produce an optical signal. Such an optical signal may be at a WDM wavelength different from an input WDM wavelength when the wavelength conversion is desired, or an amplified version of an input optical signal when the regeneration is desired, or a new optical signal at a desired WDM wavelength in response to an electronic signal that drives the semiconductor medium. Such a semiconductor optical amplifier may substitute a laser for the wavelength conversion, signal regeneration, or generation of a new signal without converting an input optical signal into an electronic signal.

DETAILED DESCRIPTION

Figure 1:
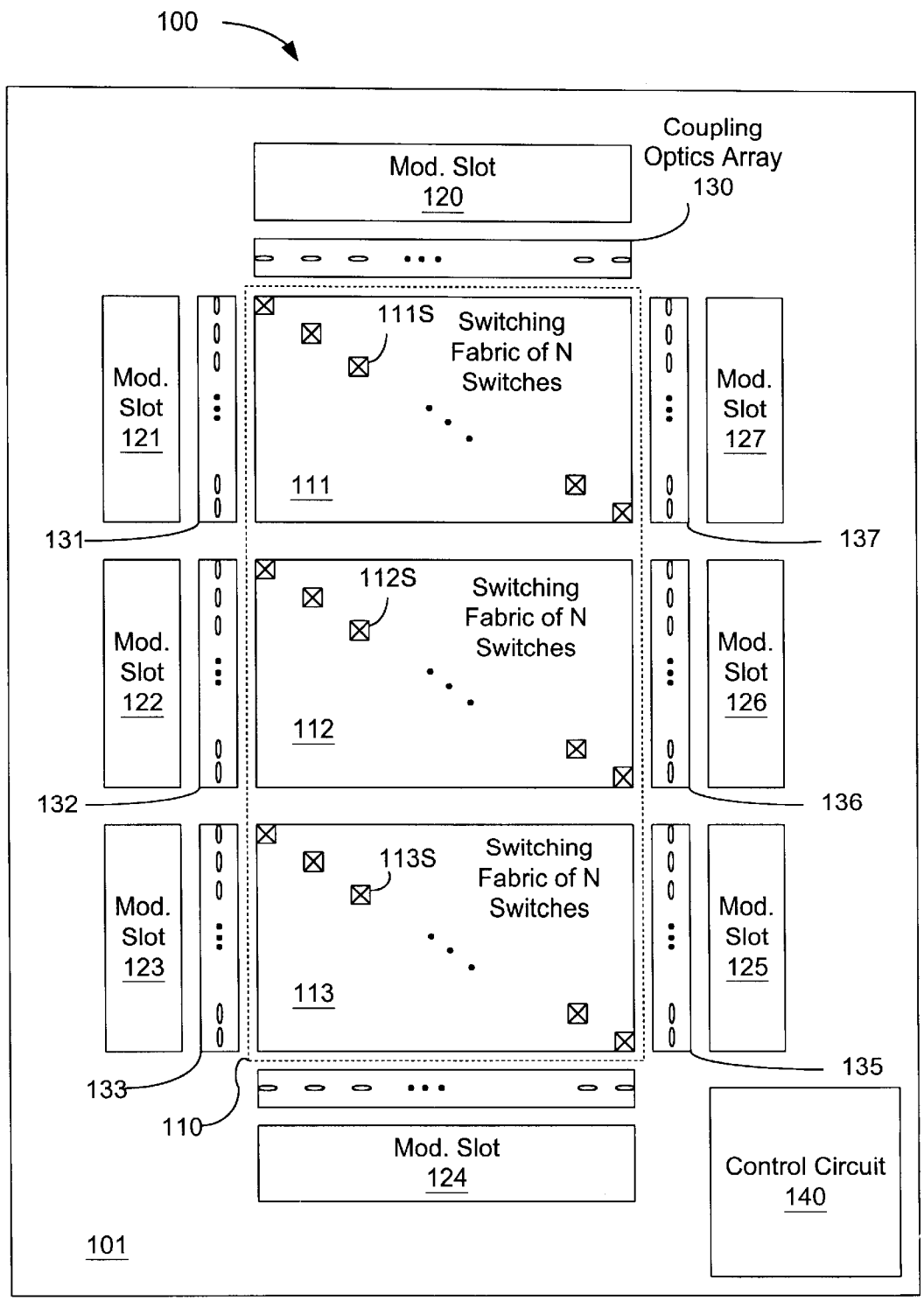
FIG. 1 shows one embodiment of a modular WDM processing system according to one embodiment.

FIG. 1 shows one embodiment of a hybrid WDM processing system 100 with a scalable and versatile modular architecture. The WDM processing system 100 includes a support platform 101 on which other components and devices are mounted or integrated. An optical switching fabric 110 with a network of optical switching elements (e.g., switches 111S, 112S, and 113S) is located on the platform 101. The switching elements can be individually controllable in response to control commands or signals to switch or route optical beams in the free space from one side of the switching fabric 110 to another. The control signals for the switching fabric 110 may be generated by a control circuit 140 on the platform 101. A servo control mechanism may be implemented in each switching element to actively monitor and correct the errors in switching an optical beam. Each switching element is optical and may be set into either a switching mode in which a beam is redirected to a desired direction, or a non-switching mode in which a beam passes through without changing its direction. The switching mode may include one or more switching states corresponding to one or more switching directions.

Module slots, e.g., 120 through 127, are formed on the platform 101 around and adjacent to different sides of the switching fabric 110. Each module slot is designed to include an engaging mechanism that removably engages a WDM module to the platform 101 to optically communicate with the switching fabric 110. Hence, each module slot may be used to engage different WDM modules if needed or be left empty without a WDM module. A WDM module, once placed in a module slot, can optically communicate with the switching fabric 110 to either transmit optical beams to or receive optical beams from the switching fabric 110. One optical beam from one WDM module engaged in one module slot can be directed by the switching fabric 110 to another WDM module engaged in another module slot at a different location.

Various WDM modules may be designed to perform a number of processing functions. The following are examples of some WDM modules.

1. An input fiber module may include an input port to receive an input fiber and a WDM demultiplexer to have an array of output ports arranged to optically communicate with different switching elements in the switching fabric 110. The WDM demultiplexer separates different wavelength channels from the input fiber into the different output ports.

2. An output fiber module includes an array input ports to receive optical beams for different channels from the switching fabrics 110 and a WDM multiplexer to combine the channels into an output fiber.

3. A detector module may include an array of photosensors to receive beams of different channels and convert the channel signals into electronic signals for, e.g., electronic processing, signal monitoring, wavelength conversion, or signal regeneration.

4. An add or drop channel module may include an array of fibers optically coupled to the switching fabric 110 to optically add or drop one or more channels. The same drop channel module may operate to drop channels for one portion of a WDM system and to add channels for another portion of the WDM system (see, e.g., the add/drop module 610 in FIG. 6, infra.).

5. A laser module may include an array of lasers to produce laser beams of different WDM wavelengths for the WDM operation. The laser module may be used to regenerate one or more particular channels at the same WDM wavelengths to restore the signals, or to generate a WDM wavelength to carry the data originally carried at a different WDM to avoid contention. In addition, the laser module may generate one or more new channels to operate as an add channel module.

6. The WDM modules may also include a wave locker module with an array of wavelength sensitive sensors to detect the frequency stability of the beams from the laser module and to produce control signals to stabilize the lasers. This module may be integrated within the laser module.

7. An optical-to-electrical interface module may be included to use the optical WDM channels to drive the laser module for signal regeneration or wavelength conversion. A switching mechanism may be included to rearrange the sequence of the received WDM channels so that a WDM channel can be used to drive a desired laser at a particular WDM wavelength in the laser module (see, e.g., FIGS. 8A and 8B, infra.).

8. An optical wavelength converter may also be used as a WDM module to optically convert a channel at one WDM wavelength to a channel at a different WDM wavelength. One optical mechanism for optical converters injects both the modulated signal beam at the WDM wavelength and a unmodulated probe beam at the different WDM wavelength into an optical medium. The medium responds to the modulation in the signal beam to produce the same modulation on the probe beam so that that the output probe beam copies the data on the signal beam. Semiconductor optical amplifiers can be used to construct such optical converters based on either cross-gain modulation or cross-phase modulation. Nonlinear wave mixing can also be used. See, Ramaswami and Sivarajan, Chapter 3 in "Optical Networks: A Practical Perspective," Academic Press, San Diego (1998). One advantage of such an optical wavelength converter is its independence with respect to protocols and data formats.

The above cross-gain or cross-phase modulation in a semiconductor optical amplifier can also be used to construct an optical signal regenerator or adder. The optical signal regenerator uses the modulated input signal beam and another unmodulated probe beam at the same WDM wavelength to overlap within the semiconductor medium. The signal beam is amplified by transferring energy from the probe beam to the signal beam. The optical signal adder is a semiconductor amplifier where the gain of the semiconductor medium is electronically modulated so that a new data channel is impressed onto an input optical beam.

Therefore, such optical cross-gain or cross-phase devices can be used to replace the lasers for regeneration, generation, and wavelength conversion when transparency to protocols and data formats is desirable.

These modules represent only examples of WDM modules and it is contemplated that WDM modules with above or other functions or some combinations of functions may be also be used. The control circuit 140 may perform certain processing and control operations for WDM modules in addition to controlling of the switching fabric 110.

An optical collimating array may be located between a module slot and the switching fabric 110 to ensure each optical beam is collimated and thus to maintain a desired optical coupling efficiency. The system 100 is shown to place such an optical collimating array (e.g., 130 through 137) between each module slot and the switching fabric 110. Each optical collimating array generally includes an array of collimating optical elements (e.g., 130A) that are arranged in alignment with a set of respective switching elements in the switching fabric 110 for that module slot. Alternatively, optical collimating arrays may be placed only between selected module slots and the switching fabric 110.

Notably, the switching fabric 110 is all optical in the sense that an optical beam is optically directed to a desired destination without optical-electronic-optical conversion by the switching elements. Hence, optical beams of various wavelengths can be switched and routed by the switching fabric 110 no matter what their data formats are. The aforementioned all optical wavelength converter is also a transparent WDM module. This feature provides the transparency and fast operations to the hybrid WDM system 100.

In addition, the WDM system 100 also includes "opaque" electrical WDM modules such as a detector module that converts the optical signals into electronic data for processing or monitoring purposes or a laser module that generates one or more beams for regenerating a channel signal or adding a new channel signal. Such electrical modules are format specific and must be designed to operate in compliance with one or more specific protocols or data formats. The combination of the laser module and detector module can make the WDM system 100 more versatile and adaptable to the requirements of various WDM applications.

For example, the switching fabric 110 can be controlled to direct one or more optical channels to the detector module to monitor the signal quality or other signal characteristics of such channels. If the bit error rate for a particular optical channel is higher than an acceptable level, the control circuit 140 may command the laser module to regenerate that channel before it is sent out to ensure the fidelity of the data transmitted in that channel.

For another example, if the WDM system 100 has two module slots to receive WDM signals from two input fibers, a contention problem can rise when two different channels of data from the two input fibers are carried by input optical beams of identical or similar wavelengths and the application requires to send both channels out in a single output fiber by wavelength division multiplexing. In addition to using the optical wavelength converter module, the present WDM system 100 can overcome this conflict in wavelength by commanding the laser module to generate a new laser beam at a different wavelength to carry one of the two conflicting channels.

The hybrid, modular WDM system 100 is also adaptive to technical changes and modifications or developments in industrial standards. Each WDM module can be modified or replaced as needed without affecting other modules. For example, if a new WDM data protocol or data format is adopted in the environment in which the WDM system 100 operates, a WDM module whose operation is affected by the protocol or data format, such as the laser module or the detector module, can be replaced by a new WDM module in compliance with that protocol or format, without changing the other portion (e.g., other WDM modules) of the WDM system 100. Hence, different from many conventional WDM processing systems, the present hybrid WDM modular design allows a system to "evolve" with new developments in the WDM technology.

The number of the switching elements in the switching fabric 110 determines the maximum number of WDM channels that can be simultaneously processed in the WDM system 100. Each WDM module may only use a portion of the full channel capacity of a module slot and can be modified or replaced to add additional channels when needed. For example, assuming the switching fabric 110 can process up to 124 channels, each module slot then has a full channel capacity of 124 channels. A WDM laser module, however, may have only an array of 8 lasers to produce 8 laser beams of different wavelengths for a particular application, leaving the remaining 116 positions empty. When the WDM system 100 requires 32 or 64 channels, additional lasers may be added to the laser module or a new laser module with 32 or 64 lasers may be used to replace the 8-laser module. This example illustrates the advantage of the scalability of the present modular architecture of the WDM system 100.

In general, the applicable WDM modules mounted on the platform 101 for a specific WDM application may be arranged on the available module slots in accordance with the configuration of the switching fabric 110 and the available switching states of the switching elements in the switching fabric 110. This is because a receiving WDM module, such as a detector module or a channel MUX module, must be positioned relative to the switching fabric 110 in a properly situated module slot to receive the proper optical beams of different wavelengths. The following describes two exemplary types of switching fabric 110: the blocking switching fabric and non-blocking switching fabric.

Figure 2:
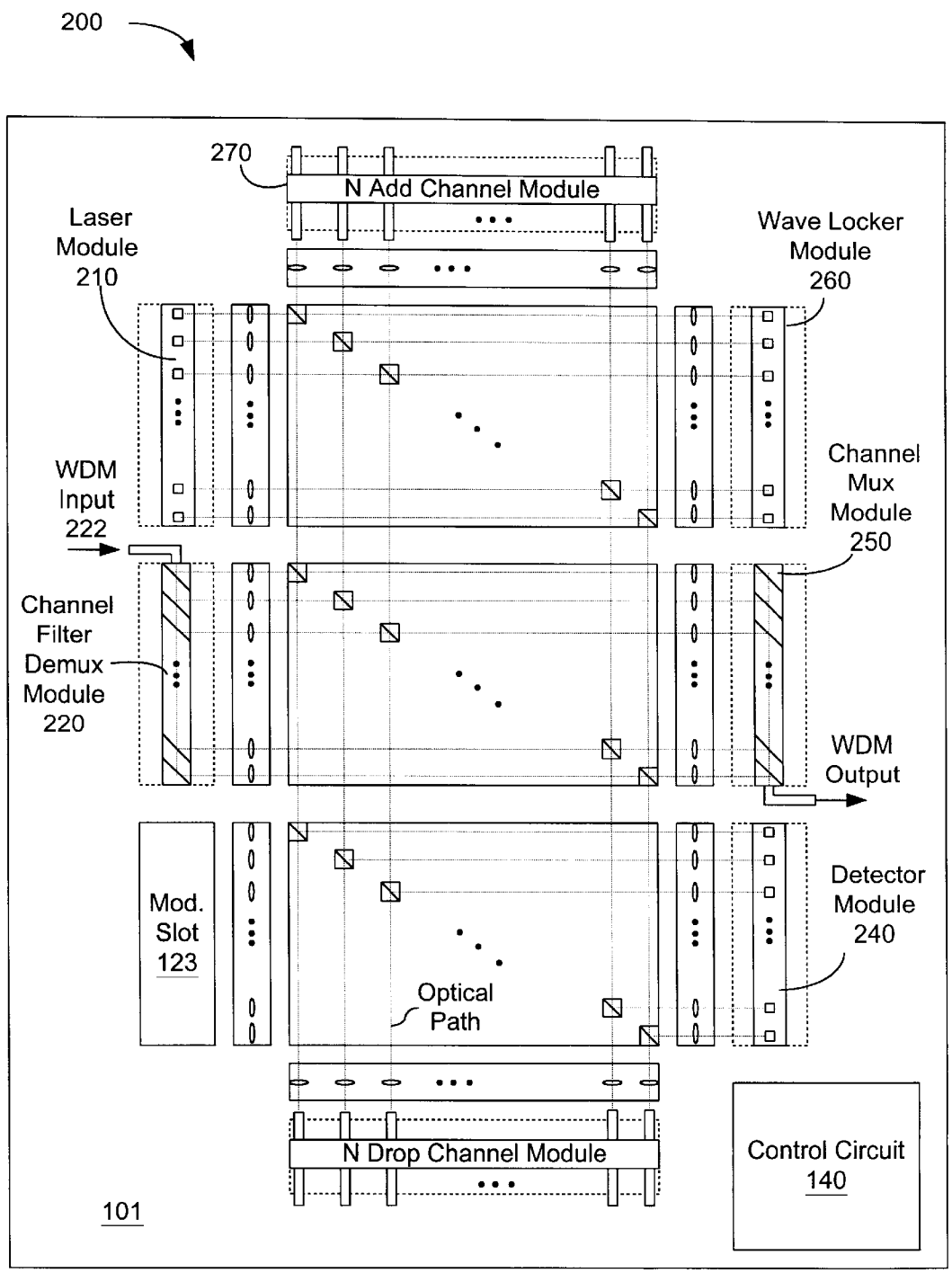
FIGS. 2 and 3 show exemplary implementations of modular WDM systems using three diagonal switching arrays based on the design in FIG. 1.
Figure 3:
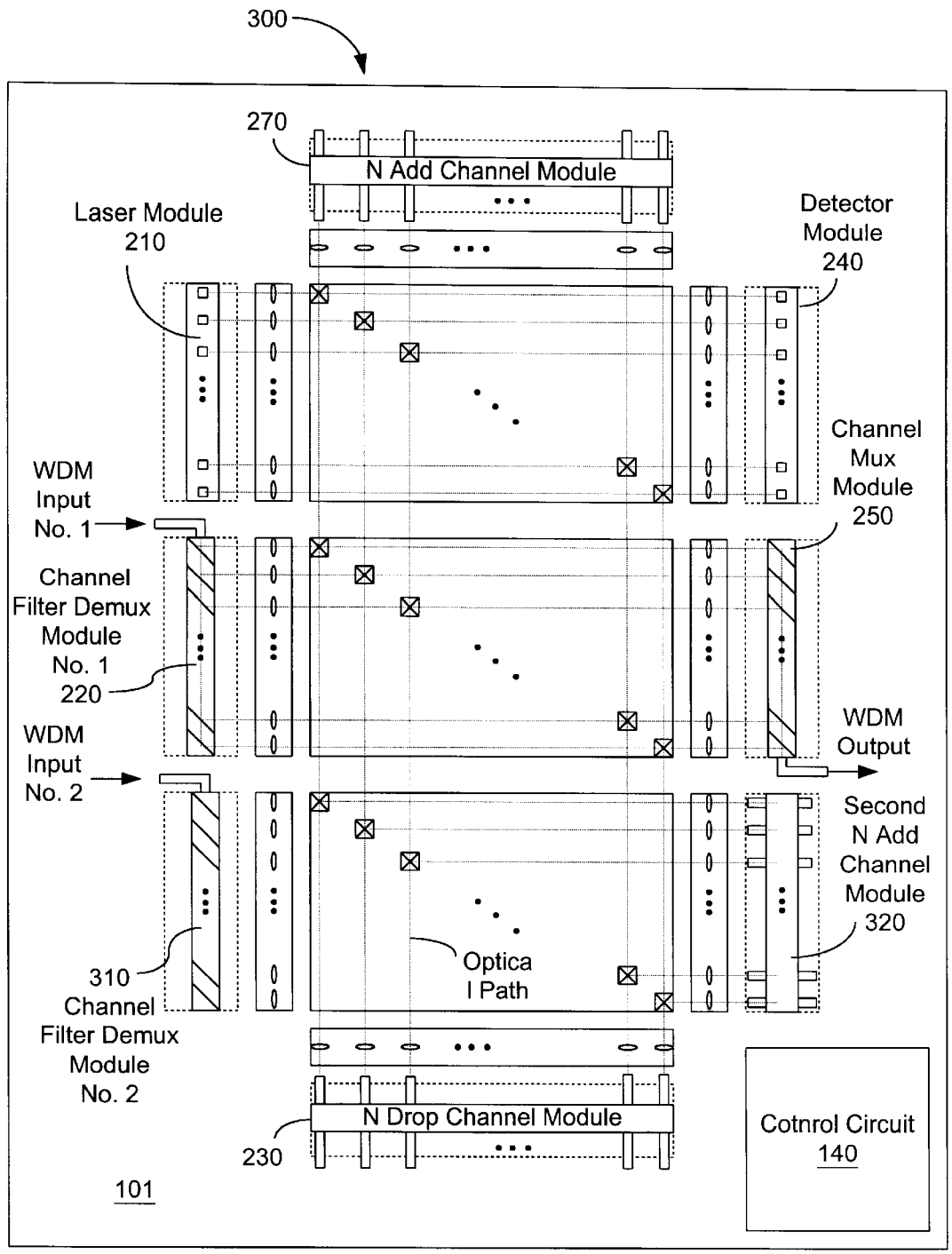

In a blocking switching fabric, when a switching element is set to direct one beam from a transmitting WDM module to a receiving WDM module, the switching element blocks another beam from another transmitting WDM module to reach the same receiving WDM module. The free-space switching fabrics shown in FIGS. 1, 2, and 3 are blocking when each switching element in the switching mode is a reflector. Such a reflector switching element may be positioned into a respective optical path of one or more transmitting WDM modules to operate in the switching mode by reflecting one or more beams, or may be positioned out of the respective optical path when operating in the non-switching mode. In the switching mode, the reflector may have only one orientation so that an input beam can be only reflected to one fixed direction, or have two or more orientations so that an input beam can be reflected to two or more fixed directions.

As illustrated, a diagonal switching array of 2×2 optical switching elements is used as the building block for the switching fabric 110. The switching fabric 110 may include one or more such diagonal switching arrays. In FIG. 1, for example, the switching fabric 110 includes three diagonal switching arrays 111, 112, and 113 arranged in a serial configuration. In this arrangement, the number N of switching elements in each diagonal switching array sets the upper limit of the number of different channels in a WDM input that can be processed simultaneously. The numbers of WDM inputs and outputs are not so limited if the number of channels does not exceed N. More WDM inputs and outputs can be accommodated by simply adding more diagonal switching arrays or increasing the switching states of the switching elements.

FIG. 2 shows one implementation 200 of a hybrid WDM system using three diagonal switching arrays based on the modular system 100 shown in FIG. 1. Each 2×2 switching element is a reflector and has only one switching state when the reflective surface is along the diagonal direction in the switching mode: a beam incident from the left side is reflected downward by one reflective surface of the reflector and the beam incident from the top is reflected rightward by another opposing reflective surface. Hence, the reflector in each switching element prevents the incident beam from the left from going to the right. Under such a switching fabric design, the system 200 uses a laser module in the module slot 121, a channel filter demux module 220 in the module slot 122, an add channel module 270 in the module slot 120, a channel mux module 250 in the module slot 126, a detector module 240 in the module slot 125, and a drop channel module 230 in the module slot 124. A wave locker module 260 may be optionally placed in the module slot 127.

If each 2×2 switching element can have another switching state by rotating the reflector by 90 degrees, an expanded system 300 in FIG. 3 may be constructed with a second channel filter demux module 310 at the module slot 123, a second channel mux module 320 at the slot 125 by moving the detector module 240 to the slot 127 across the laser module 210. Note that with proper controls of the switches, any input optical beam from the add channel module 270, the laser module 210, the two demux modules 220 and 310, or the second add channel module 320 can be directed to any of the detector module 240, the mux module 250, and the drop channel module 230. Additional diagonal switching array can be added to further increase the number of inputs and outputs.

An alternative design for the switching fabric is a non-blocking approach. In a non-blocking design, each switching element includes a non-blocking switch to allow any input to reach any output regardless the operating mode of the switch. The input signal coupled to each input port is directed to any of the output ports as desired and all input signals are respectively directed to their desired output ports depending on the control signal to each non-blocking switch. A 2×2 non-blocking switch, for example, can switch two inputs to two different outputs at the same time.

Figure 4:
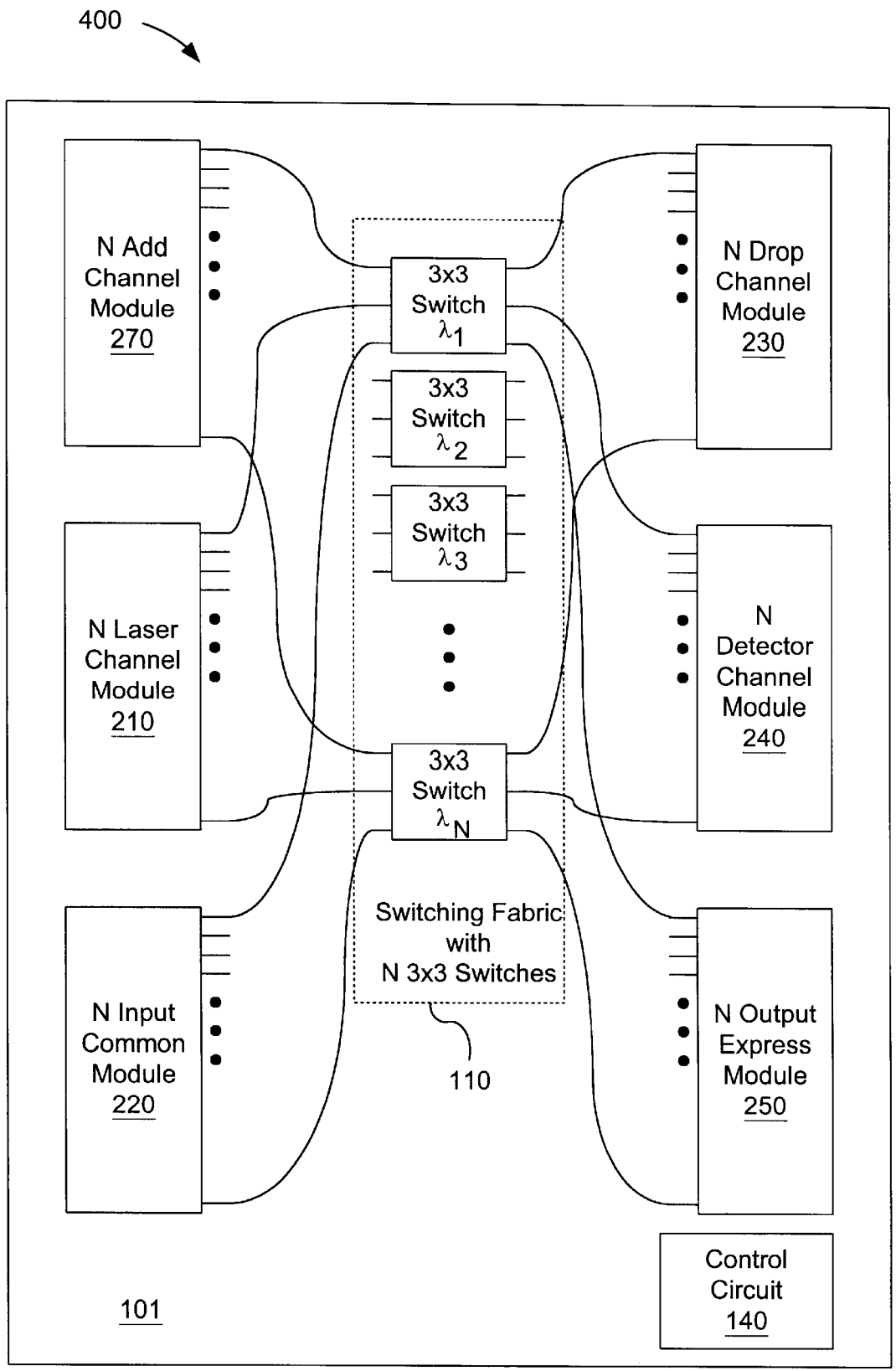
FIGS. 4 and 5 show two exemplary implementations of modular WDM systems using a switching fabric formed of non-blocking optical switches.
Figure 5:
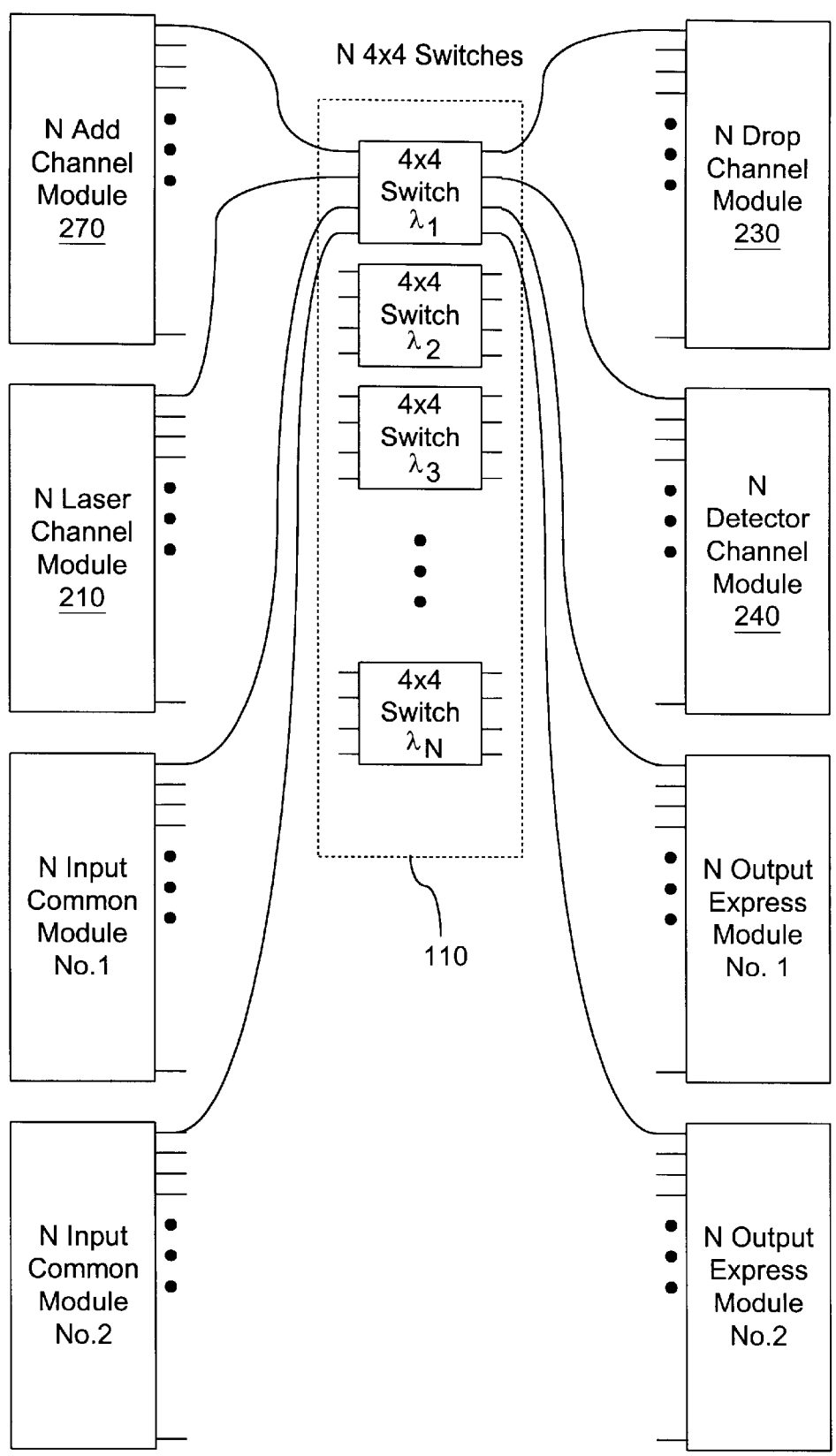

FIGS. 4 and 5 show two non-blocking type WDM systems based on the modular platform 101 using 3×3 and 4×4 non-blocking switches as the switching fabric 110, respectively. The switching fabric includes non-blocking switches that are optically independent to one another and are operable to switch optical signals of different WDM wavelengths. The WDM modules are divided into light-transmitting modules that transmit light towards the switching fabric (e.g., a laser module, an add channel module, and an input demux module) and light-receiving modules that receive light from the switching fabric (e.g., a drop channel module, a detector module, and an output mux module). The number of input or output terminals of each non-blocking switch should be equal to or greater than the greater of light-receiving modules and the light-transmitting modules. The input terminals of each non-blocking switch are respectively coupled to the light-transmitting modules and the output terminals are respectively coupled to the light-receiving modules.

Each terminal of each non-block switch is uniquely coupled to a designated channel output of a light-transmitting module or a designated channel input of a light-receiving module. Hence, the number of non-blocking switches sets the upper limit to the number of WDM channels that can be simultaneously processed. The number of input or output terminals in each switch sets the upper limit to the number of light-transmitting or light-receiving modules. For example, assuming the switching fabric includes N non-blocking switches with each having K inputs and K outputs, both the maximum number of light-transmitting modules and the maximum number of light-receiving modules are K. The maximum number of WDM channels at different WDM wavelengths in each module is N. When only n<N number of WDM channels are received, only n number of non-blocking switches are used for switching and the remaining (N−n) non-blocking switches are unused.

In FIG. 4, the three input ports of each 3×3 switch are respectively connected to receive three WDM channels from the add channel module, the laser channel module, and the input common module, respectively. Its three output ports, accordingly, are connected to three assigned input ports for in the drop channel module, the detector channel module, and the output express module, respectively. Different switches are connected to different input and output terminals at different WDM wavelengths. An input WDM channel from the input common module, for example, may be switched to a designated input terminal of the drop channel module, or the detector channel module, or the output express module.

One embodiment of such a non-blocking K×K switch is a fiber coupled switch where the K input ports and K output ports are fiber coupled. Thus, unlike the switching fabric shown in FIGS. 1–3, where each switch communicates with various signal blocks via free space, the non-block switch here communicates with WDM modules by fiber links. In the free space communication, although collimated, each beam still has a certain degree of divergence due to its Gaussian beam properties. Hence, it may be desirable to limit the optical path length to about one Rayleigh length from a terminal where an optical signal is originated, e.g., the add channel block, to another terminal where the optical signal is received, e.g., the output express block. This is to reduce the optical loss during the switching operation. When the fiber-coupled non-blocking switches are used, the fiber links relaxes such restriction on the optical path length. Alternatively, the fiber links may be replaced by waveguides.

Each non-blocking switch may be implemented with a plurality of optical switches to switch inputs to the outputs in the free space internally. Within each switch, the optical length from on input port to another input port may be limited to the Rayleigh range as described above. A servo loop may be used between each switch and each output port to ensure that the beam of a switched signal is approximately centered at the receiving facet of each output port. A photosensing element may be used at each output port to determine whether a switched beam from a switch is properly centered at an output port. If not, an error signal may be generated and is fed back to that switch so that the orientation of the switch is adjusted to center the beam.

Figure 6:
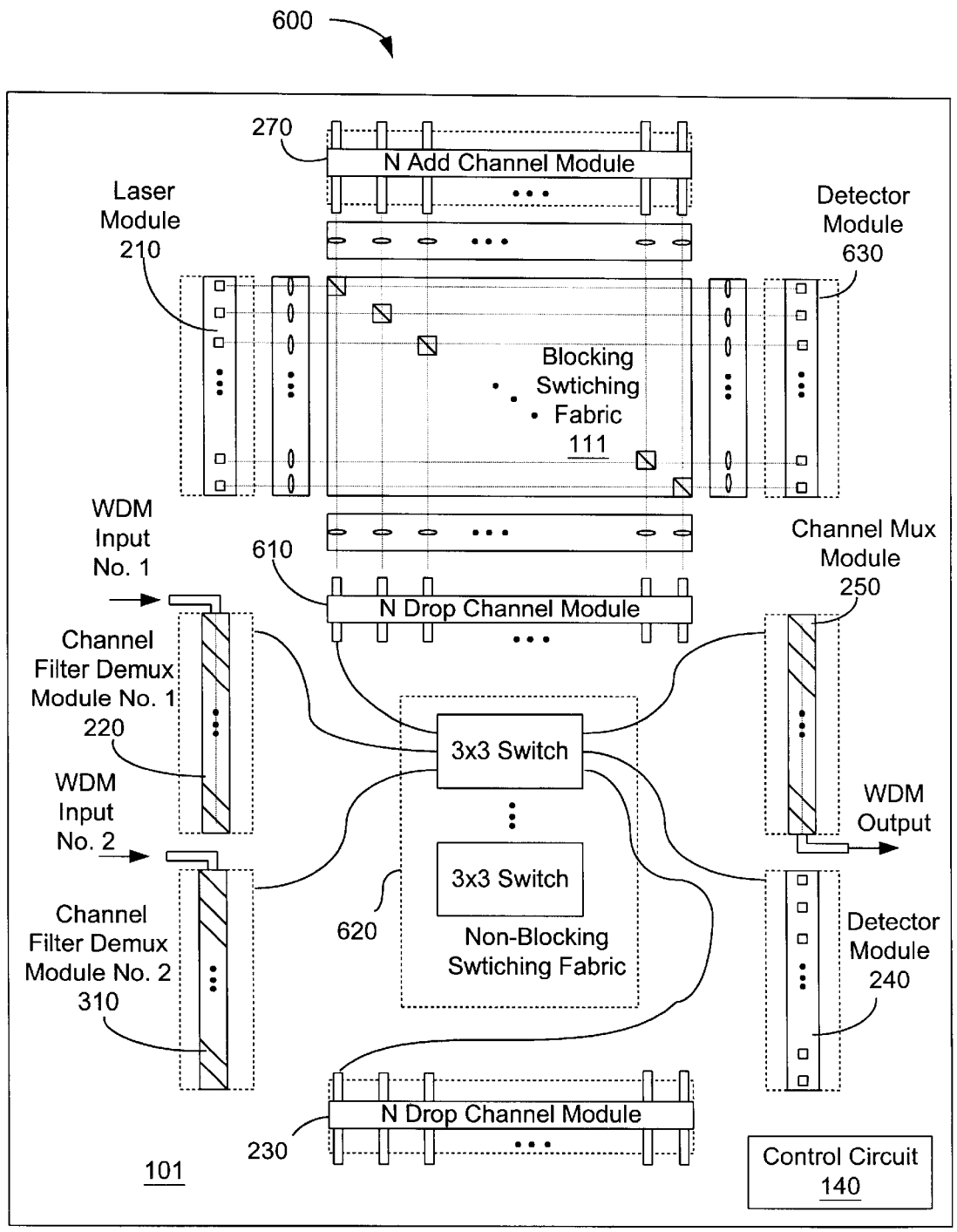
FIG. 6 shows one embodiment of a modular WDM system which combines a blocking switching fabric with a non-block switching fabric.

Blocking switches and non-blocking switches may be combined to form a switching fabric for a modular WDM system. FIG. 6 shows one example of such a system 600 formed on the platform 101. The switching fabric includes a blocking part 111 and a non-blocking part 620. A N drop channel module 610 is used as an interface to couple the beams from the blocking part 111 in the free space into the fibers of the non-blocking part 620. The blocking part 111 switches the beams from either the laser module 210 or the add channel module 270 to the drop channel module 610. A detector module 630 may be placed in the remaining module slot 127 to receive beams from the laser module 210 or the add channel module 270. The drop channel module 610 operates as a light-transmitting module for the non-blocking part 620. In the example of 3×3 non-blocking switches shown, the other two additional light-transmitting modules may be two demux modules 330 and 310. The respective three light-receiving modules may be the channel mux modules 250, the detector module 240, and the drop channel module 230. Only connections for one 3×3 non-blocking switch are shown.

Figure 7A:
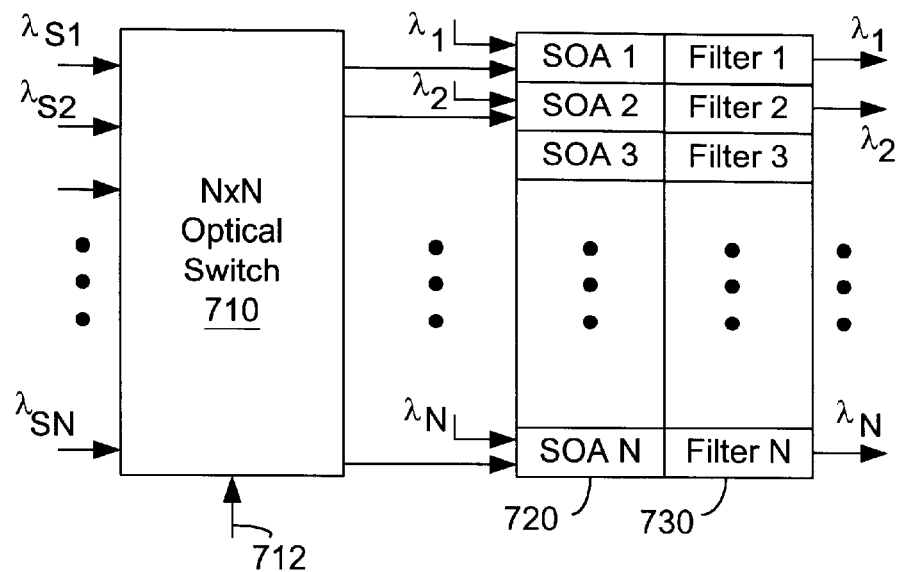
FIGS. 7A and 7B show two exemplary embodiments of an optical wavelength conversion module based on optical gating in semiconductor optical amplifiers.
Figure 7B:
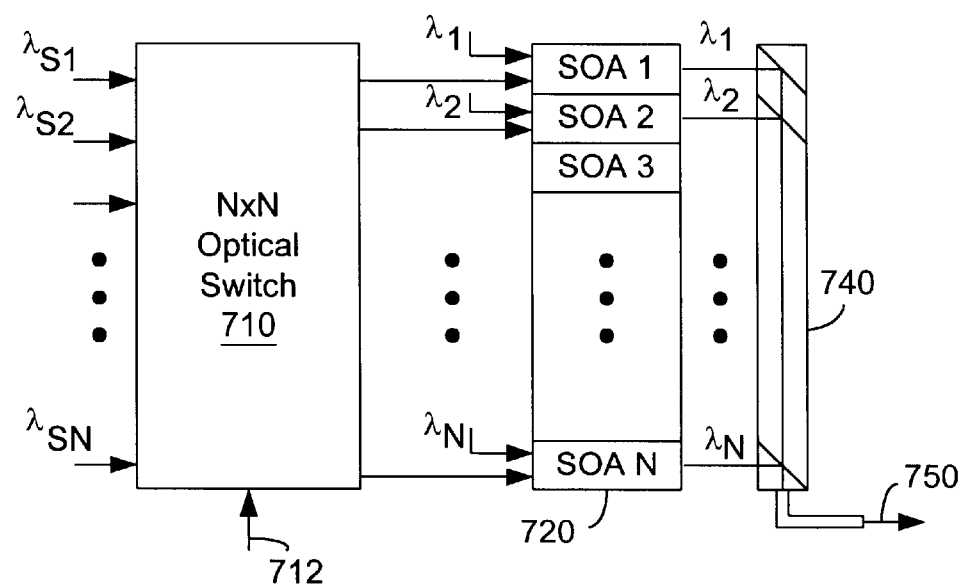

FIG. 7A shows one embodiment of a WDM optical wavelength converter (OWC) based on optical gating in an array of semiconductor optical amplifiers (SOAs). A N×N optical switch 710 has N inputs and N outputs and is operable to switch an input to any of its outputs in response to a control signal 712. The SOAs in the SOA array 720 respectively receive N outputs from the switch 710. Each SOA also receives a unmodulated input beam at a designated WDM wavelength. The interaction between the modulated WDM signal from a respective output of the switch 710 and the SOA causes an intensity modulation on the unmodulated input beam through cross gain modulation. An optical filter is implemented to filter the optical output from the SOA to transmit only the designated WDM wavelength for that SOA by blocking the input WDM signal from the optical switch 710. This filter and other similar filters for transmitting different WDM wavelengths designated to different SOAs form an optical filter array 730. FIG. 7B shows an alternative embodiment in which the filter array 730 is replaced by a WDM multiplexer 740 to combine the newly-converted WDM channels at different wavelengths to produce a WDM output 750.

The above OWC may be incorporated into a hybrid WDM system based on the platform 100. For example, the OWC 600 substitute the second add channel 320 in the module slot 125 for the hybrid system 300. In another example, the WDM system shown in FIG. 5 may replace the output express module No. 2 with the OWC. One advantage of such optical wavelength conversion is its transparency to protocols and data formats. The OWC can also free up the laser channel module for generating new channels or regenerating channels that are distorted or degraded.

Referring back to the WDM systems shown in FIGS. 2 through 6, the laser module 210 with an array of lasers may be operated in a number of different configurations. As a signal generator/adder to generate one or more new WDM channels, the laser module 210 is driven by electronic signals from the control circuit 140 so that electronic data is converted into optical format for WDM processing or transmission. When the laser module 210 is used to regenerate one or more WDM channels or to convert one or more WDM wavelengths, an electronic or optical switch is used so that an input WDM channel can be associated with a proper laser at a desired WDM wavelength in the laser module 210.

Figure 8A:
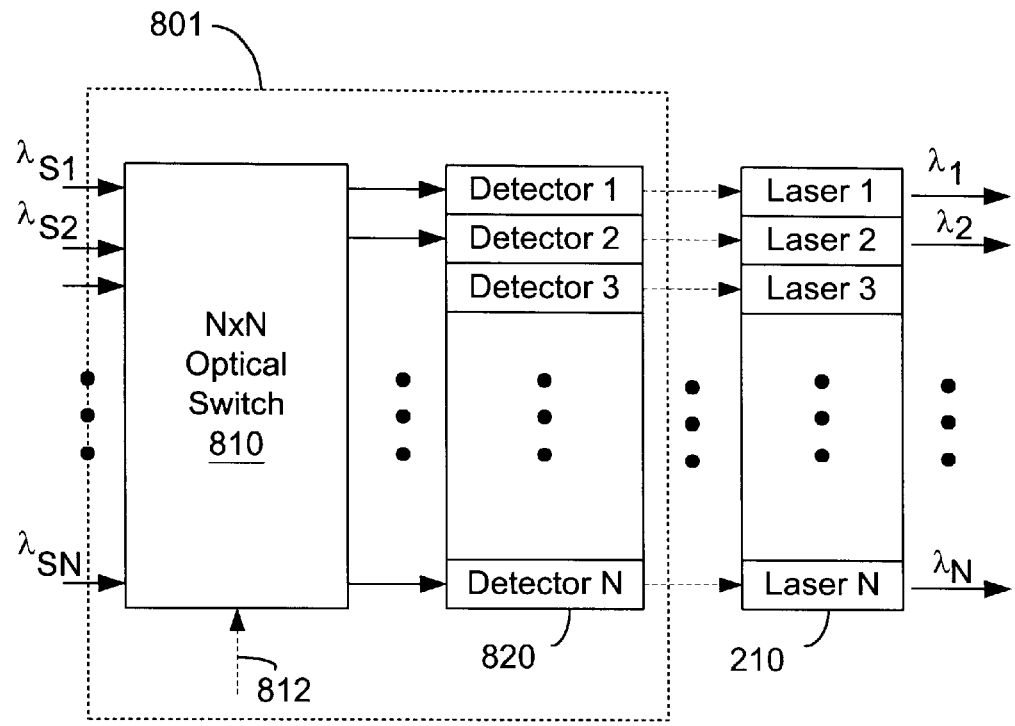
FIGS. 8A and 8B show two examples to use WDM channels to drive an array of lasers in a laser module for the wavelength conversion and signal regeneration.
Figure 8B:
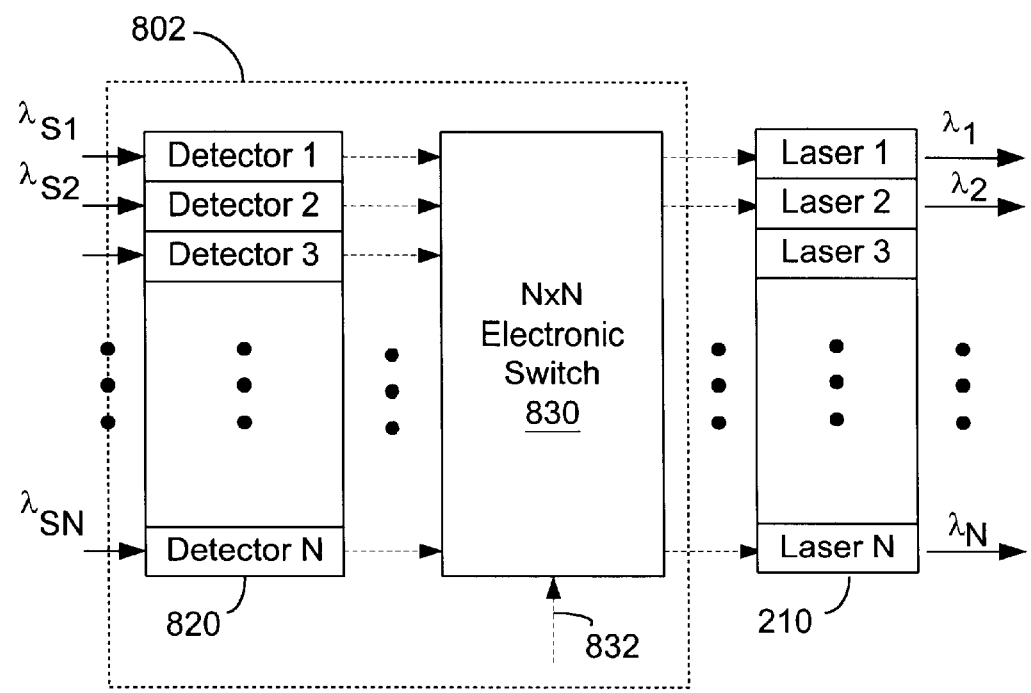

FIGS. 8A and 8B show two different configurations for using input WDM channels to drive the laser module 210. In FIG. 8A, an N×N optical switch 812 and a detector array 820 with N photosensors are used to provide an optical-to-electrical interface module 801 to drive the laser module 210. Different WDM channels are sent into the optical switch 810 to produce output WDM channels in a desired sequence. The detector array 820 receives the output WDM channels and converts them into electronic signals as indicated by the dashed lines. The electronic signals are then used to drive the laser module 210 for either wavelength conversion or signal regeneration. The optical-to-electrical interface module 802 in FIG. 8B uses a N×N electronic switch 830 in lieu of the optical switch 810. The detector module 820 is used to convert the input WDM channels into electronic signals that are rearranged by the electronic switch 830 if needed. In both configurations, an electronic switching control signal (812 or 832) is generated from the control circuit 140 to control the operation of the optical or electronic switch. The module 801 or 802 may be placed in a module slot on the platform in the systems shown in FIGS. 1 through 7.

Figure 9:
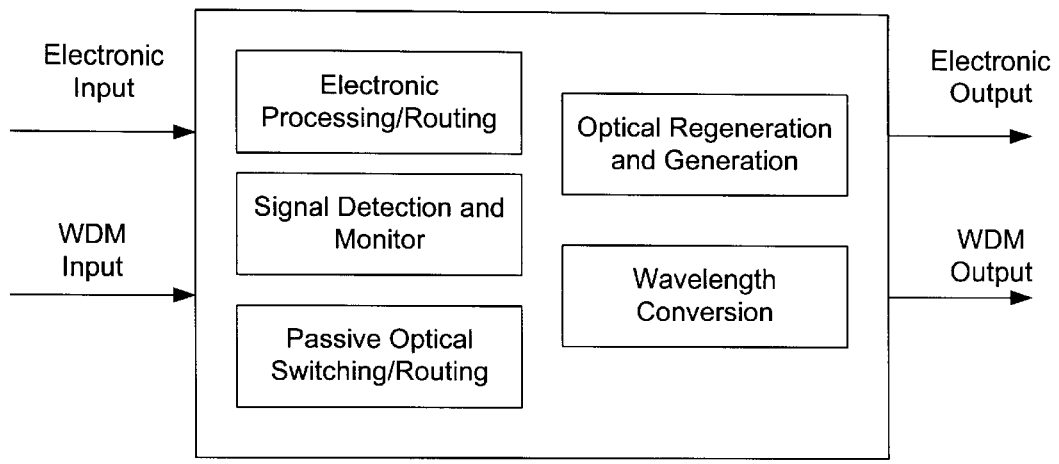
FIG. 9 illustrates some functionalities in a modular WDM system according to one embodiment.

A hybrid WDM system based on the above and other WDM modules plugged into the platform 100 in FIG. 1 may have versatile applications. FIG. 9 illustrates some of the functionalities of such a hybrid WDM system, including passive optical switching and routing, signal detector and monitor, wavelength conversion, and optical regeneration and generation. In addition, electronic IP processing and routing may also be implemented by adding an electronic IP processing module or incorporating the needed circuits and software in the control circuit 140. Hence, in addition to processing one or more WDM inputs, the system can also process one or more electronic input channels and send out electronic output channels. An electronic input channel may also be converted into an optical channel by using the laser module (e.g., 210) and added to a desired WDM signal. Depending on the types of WDM modules installed on the platform 100, the system can be configured to use any one of or a combination of functions of the WDM modules for a range of applications.

For example, when the laser module is installed, the system can function as a WDM laser transmitter to generate a multi-channel WDM signal. Assume the laser module has an array of 32 lasers and each laser can carry 10 Gbps of data. The total transmission speed of the WDM signal is then 320 Gbps. When the detector module is installed, the system can operate as a WDM receiver to convert individual channels into electronic data after demultiplexing (e.g., by the demux 220 in FIG. 2). The system can also use the input demux to filter an input WDM signal and to perform switching operations without performing the wavelength conversion or signal regeneration (i.e., protocol independent passive operations). When a new optical channel is needed in a fiber link, the system can use the laser module to create the new optical channel and add the channel to the WDM signal. The system can also multiplex two or more low-rate channels into a high-rate WDM signal or vice versa to manage the communication traffic.

Figure 10:
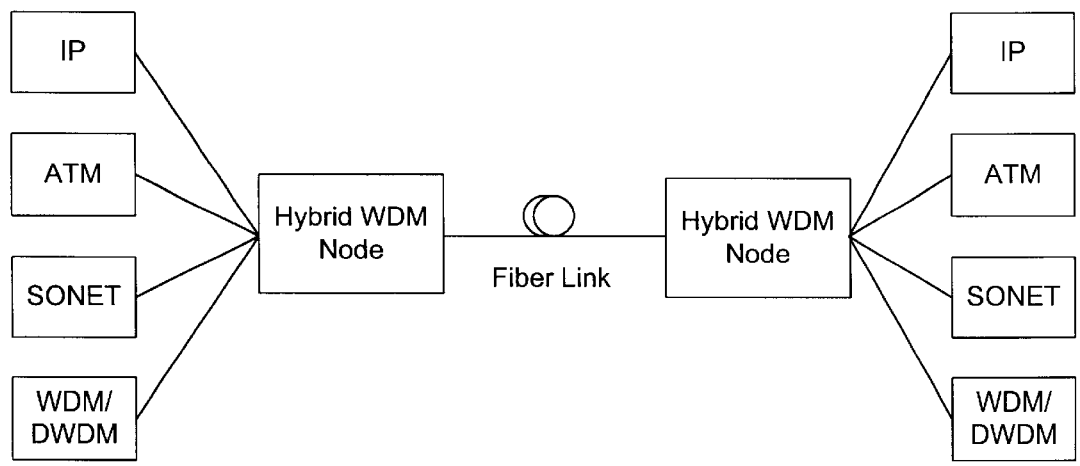
FIGS. 10 and 11 show two exemplary applications based on modular WDM processing systems.

FIG. 10 shows one exemplary application of the hybrid WDM systems in a point-to-point fiber communication link. Two hybrid WDM systems are used as two nodes in the point-to-point link. Each WDM system may receive and transmit WDM or DWDM signals over the fiber link, or add other signals in various formats (e.g., IP, ATM, SONET, SDH, PHD, etc.) to the WDM signal. The receiving WDM system may use the demultiplexing and dropping functions to separate signals of different formats.

Figure 11:
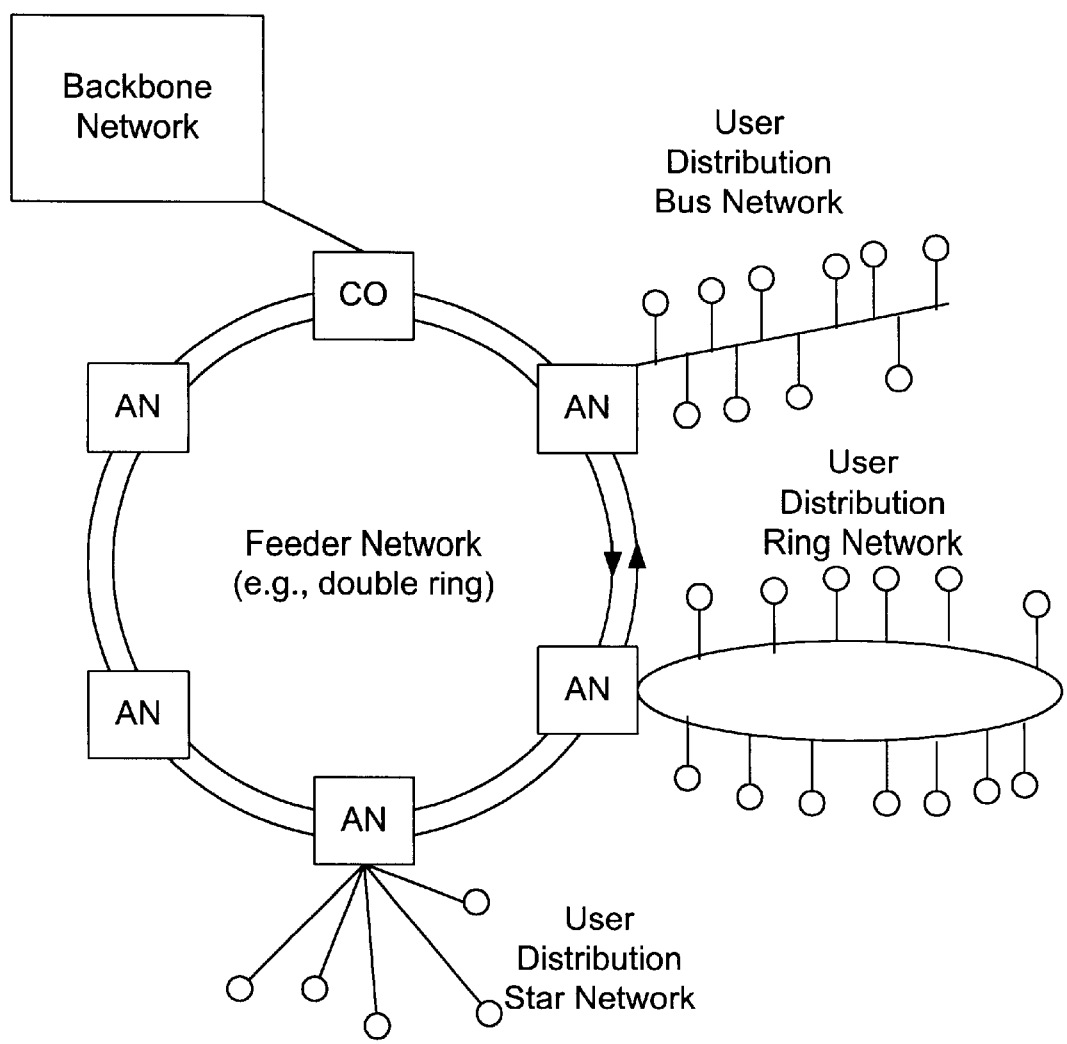

FIG. 11 shows another exemplary application of the hybrid WDM systems in a local network. The local network includes a feeder network that is connected to a backbone network and is connected to multiple user distribution networks. The hybrid WDM systems are included in the access nodes (ANs) of the feeder network to connect the users in the distribution networks. The feeder network can be designed based on a number of network topologies, including the mesh and ring configurations. The example shows a double-ring feeder network where two fiber rings in opposite directions are used. Each user distribution network may use the bus configuration, the ring configuration, the star configuration, or any other configurations.

This use of the hybrid WDM systems provides the local network with certain network intelligence and flexibility at the access node level in both the optical and electronic domains. Data channels in an input WDM signal can be transmitted through an access node passively without any optical or electronic processing if so desired. Alternatively, the data channels may be manipulated either optically or electronically before exiting the node. The optical manipulation may include optical switching, adding/dropping, or optical wavelength conversion and the electronic manipulation may include, electronic IP routing, electronically reshaping and conditioning of the data channels, and regenerating the channels.

The hybrid and modular architecture of the present WDM systems based on the platform 100 in FIG. 1 allows the original equipment manufacturer to specifically design a WDM system to meet a customer's specification. To build a customer system, the required WDM modules are specifically designed and made to meet the customer specifications. The WDM modules and associated electronic circuits are then installed on the platform 100. Next, the operation of each installed module is tested. Finally, a completed system that passes all tests is shipped to the customer. Such a system is designed to include a set of firmware instructions in the control circuit 140 so that the system can operate according to control routines and instructions of a customer network management software package. This allows the customer to change the operation pattern of the system by changing certain instructions or routines in the network management software as needed. Alternatively, a network management software package for the hardware system may be provided to the customer.

The present modular architecture further allows a completed system to be modified and expanded on the module by module basis. If the requirements for one or more modules in the completed system are changed, the system can be updated by replacing or modifying certain modules.

A number of embodiments of the invention have been described. Nevertheless, it will be understood that various modifications and enhancements may be made without departing from the following claims.

What is claimed is:

1. A system, comprising:
    a support platform;
    an optical switching network of a plurality of switching arrays of optical switches disposed on said platform to redirect one or more optical beams in response to control signals respectively applied to said optical switches, wherein each switching array includes N optical switches at discrete positions along a diagonal line of a square or rectangle;
    a plurality of module slots disposed on said platform and distributed around said optical switching network, each module slot including an engaging mechanism to removably engage a module to said platform and defining N optical positions to optically communicate with N optical switches of at least one switching array, respectively;
    an input fiber module, removably engaged to a first module slot, having an input fiber port to receive a wavelength-division-multiplexed ("WDM") signal formed of a plurality of optical carriers of different wavelengths, an array of N output ports to output said optical carriers separately towards at least a portion of N optical switches in at least one switching array, and a WDM demultiplexer to interact with said WDM signal to separate said optical carriers; and
    an output fiber module, removably engaged to a second module slot, having an array of N input ports to receive separate optical carriers of different wavelengths from said optical switching network, and a WDM multiplexer to interact with said received optical carriers to produce an output WDM signal.

2. The system as in claim 1, further comprising a laser module, removably engaged to another module slot on said platform, having an array of lasers to produce laser beams at different wavelengths and arranged to direct said laser beams to different optical switches in said switching network.

3. The system as in claim 2, further comprising an optical-to-electrical interface module, removably engaged to yet another module slot on said platform, having a signal switching unit and a photosensor array to convert laser beams of different wavelengths received from said switching network into electrical signals to drive said lasers in said laser module, respectively.

4. The system as in claim 3, wherein said signal switching unit includes an optical switch.

5. The system as in claim 3, wherein said signal switching unit includes an electronic switch.

6. The system as in claim 1, further comprising a detector module, removably engaged to another module slot on said platform, having an array of photosensors arranged to receive optical beams from different optical switches in said switching network and to produce detector output signals indicating information in said optical beams.

7. The system as in claim 1, further comprising an optical wavelength conversion module, removably engaged to another module slot on said platform, having at least one semiconductor optical amplifier to receive a signal beam at a first WDM wavelength from said optical switching network and a conversion optical beam at a second WDM wavelength different from said first WDM wavelength, wherein said semiconductor optical amplifier is responsive to a modulation in said signal beam to transfer information from said signal beam to said conversion optical beam.

8. The system as in claim 1, further comprising a semiconductor optical amplifier module with a plurality of semiconductor optical amplifiers, each coupled to receive a signal beam at a first WDM wavelength from said optical switching network and a probe beam at said first WDM wavelength to amplify said signal beam.

9. The system as in claim 1, further comprising a semiconductor optical amplifier module with a plurality of semiconductor optical amplifiers, each coupled to receive a unmodulated optical beam at a selected WDM wavelength and respond to an electrical signal to change an optical gain to impress data onto said unmodulated optical beam.

10. The system as in claim 1, further comprising a drop channel module, removably engaged to another module slot on said platform, having an array of fibers to receive one or more optical beams from said optical switching network.

11. The system as in claim 1, further comprising an add channel module, removably engaged to another module slot on said platform, having an array of fibers to couple one or more input optical beams to said optical switching network.

12. The system as in claim 1, further comprising a second input fiber module, removably engaged to a third module slot, having an input fiber port to receive another WDM signal formed of a plurality of optical carriers of different wavelengths, an array of N output ports to output said optical carriers separately towards at least a portion of N optical switches in at least one switching array, and a WDM demultiplexer to interact with said WDM signal to separate said optical carriers.

13. The system as in claim 1, further comprising a second output fiber module, removably engaged to a third module slot, having an array of N input ports to receive separate optical carriers of different wavelengths from said optical switching network, and a WDM multiplexer to interact with said received optical carriers to produce an output WDM signal.

14. A system, comprising:
    a support platform;
    an optical switching network of a plurality of optical switches disposed on said platform to redirect one or more optical beams in response to control signals respectively applied to said optical switches;
    a plurality of module slots disposed on said platform and distributed around said optical switching network, each module slot including an engaging mechanism to removably engage a module to said platform;
    an input fiber module having an input fiber port to receive a wavelength-division-multiplexed ("WDM") signal formed of a plurality of optical carriers of different wavelengths, an array of output ports to output said optical carriers separately, and a WDM demultiplexer to interact with said WDM signal to separate said optical carriers, said input fiber module removably engaged to a first module slot to couple said optical carriers to said optical switching network;
    an output fiber module, removably engaged to a second module slot, having an array of input ports at least a portion of which respectively receive optical carriers of different wavelengths from said optical switching network, and a WDM multiplexer to interact with said received optical carriers to produce an output WDM signal; a laser module removably engaged to a third module slot on said platform, having an array of lasers to produce laser beams at different wavelengths and arranged to direct said laser beams to different optical switches in said switching network; and
    a detector module, removably engaged to a fourth module slot on said platform, having an array of photosensors arranged to receive optical beams from different optical switches in said switching network and to produce detector output signals indicating information in said optical beams.

15. The system as in claim 14, further comprising an optical wavelength conversion module, removably engaged to another module slot on said platform, having at least one semiconductor optical amplifier to receive a signal beam at a first WDM wavelength from said optical switching network and a conversion optical beam at a second WDM wavelength different from said first WDM wavelength, wherein said semiconductor optical amplifier is responsive to a modulation in said signal beam to transfer information from said signal beam to said conversion optical beam.

16. The system as in claim 15, wherein said optical wavelength conversion module further includes an optical switch and a plurality of other semiconductor optical amplifiers that respectively transfer information from their signal beams to different conversion optical beams at different wavelengths.

17. The system as in claim 14, further comprising an optical-to-electrical interface module, removably engaged to another module slot on said platform, having a signal switching unit and a photosensor array to convert laser beams of different wavelengths received from said switching network into electrical signals to drive said lasers in said laser module, respectively.

18. The system as in claim 14, further comprising a first optical network coupled to send said WDM signal to said input fiber module.

19. The system as in claim 18, further comprising a second optical network coupled to receive said output WDM signal from said output fiber module.

20. The system as in claim 19, wherein said first optical network is a feeder network that connects a plurality of user distribution networks, and said second optical network is one of said user distribution networks.

21. A system, comprising:
    a platform;
    a number N of K×K optical switches located on said platform, each having K input terminals and K output terminals and operable independently from another optical switch, to switch an input to any of said K output terminals and to switch different inputs to different outputs;
    K light-producing modules located on said platform, each having a number of output terminals less than or equal to N, said output terminals of each light-producing module respectively coupled to send beams of different wavelengths to different designated input terminals of different optical switches, only one input terminal from each optical switch; and
    K light-receiving modules located on said platform, each having a number input terminals less than or equal to N, said input terminals of each light-receiving module respectively coupled to different designated output terminals of different optical switches, only one output terminal from each optical switch, wherein at least one light-producing module is an input fiber module having an input fiber port to receive a wavelength-division-multiplexed ("WDM") signal formed of a plurality of optical carriers of different wavelengths, and a WDM demultiplexer to interact with said WDM signal to separate said optical carriers to respective output terminals, and
    at least one light-receiving module is an output fiber module having a WDM multiplexer to combine input optical signals respectively received from different optical switches to produce an output WDM signal.

22. The system as in claim 21, wherein at least one of said light-producing module is a laser module which includes an array of lasers to produce laser beams at different WDM wavelengths to said optical switches.

23. The system as in claim 22, wherein one of said light-receiving modules includes an optical-to-electrical interface module which has a signal switching unit and a photosensor array to convert laser beams of different wavelengths received from said optical switches into electrical signals to drive said lasers in said laser module, respectively.

24. The system as in claim 21, wherein at least one of said light-producing modules is an add channel module which has an array of fibers to send additional optical beams to said optical switches.

25. The system as in claim 21, wherein at least one of said light-receiving modules is a drop channel module which has an array of fibers to receive output signals from said optical switches.

26. The system as in claim 21, wherein at least one of said light-receiving modules is a detector module which has an array of photosensors to receive and convert output signals from said optical switches into electronic signals.

27. The system as in claim 21, wherein at least one of said light-receiving modules is an optical wavelength conversion module which includes an optical switch block and an array of optical semiconductor amplifiers, said optical switch block operable to switch different input beams from said optical switches to different semiconductor optical amplifiers each of which is operable to transfer optical modulation in a received beam from said switch block to another beam at a different WDM wavelength.

28. The system as in claim 21, wherein each output terminal in each light-producing module and a respective input terminal in an optical switch are linked by a fiber, and each output terminal in each optical switch and a respective input terminal in a light-receiving switch are linked by a fiber.

29. The system as in claim 21, further comprising a first optical network coupled to send a WDM signal to said input fiber module, and a second optical network coupled to receive an output WDM signal from said output fiber module.

30. The system as in claim 29, wherein said first network includes a feeder network and said second network includes a user distribution network.

31. A system, comprising:

a support platform;

an optical switching network of a plurality of optical switches disposed on said platform to redirect one or more optical beams in response to control signals respectively applied to said optical switches, said switching network includes a first switching network that includes N blocking switches at discrete positions along a diagonal line of a square or rectangle area to receive and transmit light through free space, and a second switching network that includes N non-blocking switches each having K fiber input terminals and K fiber output terminals and operable independently from another optical switch to switch an input to any of said K output terminals and to switch different inputs to different outputs; and a plurality of module slots disposed on said platform and distributed around said optical switching network, each module slot including an engaging mechanism to removably engage a module to said platform and defining N optical positions to optically communicate with N optical switches from either said first switching network through free space or said second switching network through said fiber input and output terminals, respectively; and a light coupling module to couple light beams from said N blocking switches to different designated fiber input terminals of different non-blocking switches, respectively.

32. The system as in claim 31, further comprising a laser module, removably engaged to one module slot on said platform, having an array of lasers to produce laser beams at different wavelengths and arranged to direct said laser beams to different optical switches in said switching network.

33. The system as in claim 31, further comprising a detector module, removably engaged to one module slot on said platform, having an array of photosensors arranged to receive optical beams from different optical switches in said switching network and to produce detector output signals indicating information in said optical beams.

34. The system as in claim 31, further comprising an optical wavelength conversion module, removably engaged to one module slot on said platform, having at least one semiconductor optical amplifier to receive a signal beam at a first WDM wavelength from said optical switching network and a conversion optical beam at a second WDM wavelength different from said first WDM wavelength, wherein said semiconductor optical amplifier is responsive to a modulation in said signal beam to transfer information from said signal beam to said conversion optical beam.

\* \* \* \* \*